(12) United States Patent
Chevrier et al.

(10) Patent No.: US 9,680,979 B1
(45) Date of Patent: Jun. 13, 2017

(54) TELEPHONE NUMBER ADJUSTMENT

(71) Applicant: Sorenson IP Holdings, LLC, Salt Lake City, UT (US)

(72) Inventors: Brian Chevrier, Highland, UT (US); Michael Stimpson, Taylorsville, UT (US); Michael Holm, Bountiful, UT (US); Christian Lalor, Taylorsville, UT (US)

(73) Assignee: Sorenson IP Holdings, LLC, Salt Lake City, UT (US)

( * ) Notice: Subject to any disclaimer, the term of this patent is extended or adjusted under 35 U.S.C. 154(b) by 0 days.

(21) Appl. No.: 15/248,427

(22) Filed: Aug. 26, 2016

(51) Int. Cl.
*H04M 1/56* (2006.01)
*H04M 15/06* (2006.01)
*H04M 1/57* (2006.01)
*H04M 3/42* (2006.01)

(52) U.S. Cl.
CPC ....... *H04M 1/575* (2013.01); *H04M 3/42059* (2013.01)

(58) Field of Classification Search
USPC ....................................... 379/142.06, 355.05
See application file for complete search history.

(56) References Cited

U.S. PATENT DOCUMENTS

| | | | |
|---|---|---|---|
| 5,455,858 A * | 10/1995 | Lin | H04M 1/274566 379/354 |
| 5,475,743 A | 12/1995 | Nixon et al. | |
| 6,067,349 A * | 5/2000 | Suder | H04M 1/274566 379/142.04 |
| 6,292,557 B1 | 9/2001 | Gabara | |
| 6,324,272 B1 * | 11/2001 | Abu-Shukhaidem | H04M 3/42195 379/142.01 |
| 6,360,108 B1 | 3/2002 | Rogers | |
| 6,449,475 B1 * | 9/2002 | Chinnaswami | H04M 1/274566 379/142.06 |
| 6,567,675 B1 | 5/2003 | Rosen et al. | |
| 6,643,369 B1 | 11/2003 | DiMarco | |
| 6,751,311 B1 | 6/2004 | Arnold et al. | |
| 6,940,965 B1 | 9/2005 | Arnold et al. | |
| 6,941,159 B2 | 9/2005 | Tsai et al. | |
| 7,113,585 B1 | 9/2006 | Breckenridge | |
| 7,257,210 B1 * | 8/2007 | Henderson | H04M 1/576 340/7.56 |
| 9,191,506 B1 | 11/2015 | Yablon | |
| 2002/0137549 A1 | 9/2002 | Porter | |
| 2003/0190037 A1 | 10/2003 | Hruska | |
| 2004/0136514 A1 | 7/2004 | Rambo | |

(Continued)

FOREIGN PATENT DOCUMENTS

WO 2004059956 A1 7/2004

*Primary Examiner* — Quoc D Tran
(74) *Attorney, Agent, or Firm* — Maschoff Brennan

(57) ABSTRACT

A method to adjust a phone number is provided. The method may include receiving a first phone call at a telephonic device and obtaining a phone number from the first phone call. In some embodiments, the phone number may identify an origin of the first phone call. The method may further include prepending a digit to the phone number and storing the phone number with the prepended digit in a memory in the telephonic device. In some embodiments, the method may further include using the stored phone number to initiate automatic placement of the second phone call.

19 Claims, 9 Drawing Sheets

(56) References Cited

U.S. PATENT DOCUMENTS

2004/0249649 A1* 12/2004 Stratton ............... G06Q 30/04
379/114.03
2009/0034705 A1* 2/2009 Janssen ............... H04M 1/575
379/142.06

* cited by examiner

TELEPHONE NUMBER ADJUSTMENT

FIELD

The embodiments discussed herein are related to adjustment of telephone numbers.

BACKGROUND

Countries typically have individual numbering plans that specify how telephone numbers for making telephone calls are structured within the country. To route telephone calls between networks, telephone switching systems may include dialing prefixes. The dialing prefixes may include 1+, 0+, area codes, international access codes, and foreign country and city codes. In the United States and other North American countries, the telephone numbering is standardized by the North American Numbering Plan (NANP). NANP numbers are ten digits in length, where the first three digits are called the area code, the second three digits are called the central office code, and the last four digits are the line number.

The subject matter claimed herein is not limited to embodiments that solve any disadvantages or that operate only in environments such as those described above. Rather, this background is only provided to illustrate one example technology area where some embodiments described herein may be practiced.

SUMMARY

A method to adjust a phone number is provided. The method may include receiving a first phone call at a telephonic device and obtaining a phone number from the first phone call. In some embodiments, the phone number may identify an origin of the first phone call. The method may further include prepending a digit to the phone number and storing the phone number with the prepended digit in a memory in the telephonic device. In some embodiments, the method may further include using the stored phone number to initiate automatic placement of the second phone call.

BRIEF DESCRIPTION OF THE DRAWINGS

Example embodiments will be described and explained with additional specificity and detail through the use of the accompanying drawings in which.

DESCRIPTION OF EMBODIMENTS

Phone companies have over time adjusted dialing prefixes that may be used to route telephone calls. For example, previously, some phone companies allowed calling using seven or ten digit phone numbers. Now, those same phone companies may request ten or eleven digits for a valid phone number.

In some circumstances, phone companies may not connect a phone call that is placed with an incorrect dialing sequence, such as with a wrong number of digits. As a result, a phone call that is placed with an incorrect dialing sequence may be rejected by a phone company.

Even though phone companies may reject phone calls placed with incorrect dialing sequences, some phone companies may provide caller identification information with incorrect dialing sequences. For example, when an incoming call is received at a telephonic device, the phone company may provide caller identification information about the incoming call. The caller identification information may include a phone number of the origin of the incoming call. If the caller identification information includes an incorrect dialing sequence for the phone number, using the caller identification information to place a call may result in the call being rejected by the phone company.

Some embodiments in this disclosure relate to a method and/or system that may be configured to adjust a phone number when it is received from the phone company. For example, when the phone number is part of caller identification information received from a phone company, the phone number may be adjusted and then stored in the telephonic device for future use. In some embodiments, the phone number may be analyzed by the telephonic device to determine if the phone number includes an incorrect dialing sequence based on one or more particular rules. When a phone number is identified as including an incorrect dialing sequence, the phone number may be adjusted and then stored for future use. In some embodiments, the adjustment of the phone number may include prepending a digit to the phone number. Alternatively or additionally, the future use of the phone number may include being used for a redial function, for saving in contacts, being displayed, or other future uses of the phone number by the telephonic device.

Figure 1:
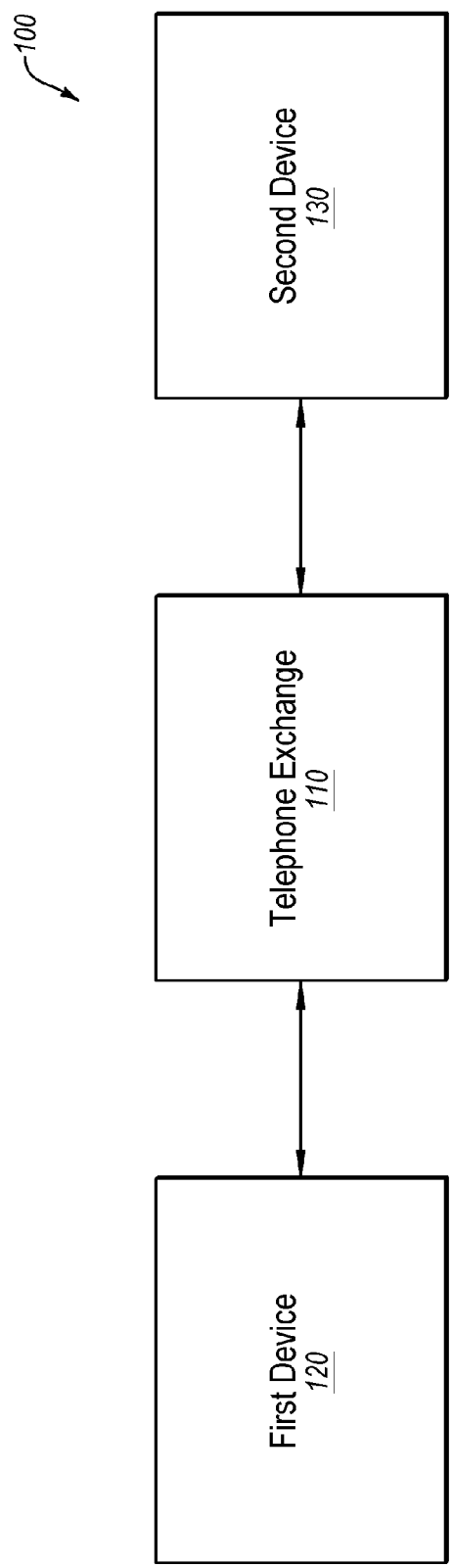
FIG. 1 illustrates an example system configured to adjust a phone number.

Turning to the figures, FIG. 1 illustrates an example system 100 configured to adjust a phone number. The system 100 may be arranged in accordance with at least one embodiment described in the present disclosure. The system 100 may include a telephone exchange 110, a first device 120, and a second device 130.

The telephone exchange 110 may be a system configured to route, process, or otherwise handle analog or digital phone calls. For example, the telephone exchange 110 may be a public switched telephone network (PSTN), which includes elements such as private branch exchange (PBX), local exchange carrier (LEC), or an interchange carrier (IXC). Alternatively or additionally, the telephone exchange 110 may be a digital system based on providing phone calls using Internet Protocol (IP) procedures such as Voice over Internet Protocol (VoIP) procedures. Alternatively or additionally, the telephone exchange 110 may include a combination of a PSTN and an IP based system. In these and other embodiments, the telephone exchange 110 may include multiple combinations of networks, such as wireless networks including a Frequency Division Multiple Access (FDMA) network, an Orthogonal FDMA (OFDMA) network, a Code Division Multiple Access (CDMA) network, a Time Division Multiple Access (TDMA) network, and other suitable wireless networks, and non-wireless networks, including analog, digital, optical, and other non-wireless networks. For example, an LEC of the telephone exchange 110 may be an analog network and the IXC of the telephone exchange 110 may be a digital, optical, or digital and optical networks.

In some embodiments, the telephone exchange 110 may be configured to route and process communication sessions, such as phone calls, between devices. For example, the second device 130 may direct a phone call to the first device 120 by way of the telephone exchange 110. In these and other embodiments, the second device 130 may provide a first phone number unique to the first device 120 to the telephone exchange 110. In these and other embodiments, the first phone number may be a number assigned to the first device 120 to allow other devices to contact the first device 120 through the telephone exchange 110. The telephone exchange 110 may use the first phone number to establish a communication session between the first device 120 and the second device 130. In these and other embodiments, the telephone exchange 110 may obtain a second phone number unique to the second device 130. In these and other embodiments, the second phone number may be a number assigned to the second device 130 to allow other devices to contact the second device 130 through the telephone exchange 110. In some embodiments, the telephone exchange 110 may obtain the second phone number from the second device 130, from a look-up table, from a combination thereof, or through any other manner.

The telephone exchange 110 may provide the second phone number to the first device 120 while establishing or during the communication session between the first device 120 and the second device 130. The telephone exchange 110 may be configured to maintain and/or terminate the communication session. The telephone exchange 110 may perform other procedures and/or protocols to establish, maintain, and terminate communication sessions between the first device 120 and the second device 130 and other devices.

The first device 120 may be any analog or digital device configured to receive and transmit phone calls over an analog or digital interface. For example, the first device 120 may include a phone, a phone console, telephonic device, a cellular phone, a smartphone, a laptop computer, a tablet computer, or other processing device, such as a call maintenance and routing device or caller identification or call routing type device. In some embodiments, the first device 120 may be configured to perform one or more of the following: communicate with the telephone exchange 110, establish, maintain, and terminate communication sessions with other devices through the telephone exchange 110, along with performing other functionality with respect to communication sessions through the telephone exchange 110.

The second device 130 may be any analog or digital device configured to receive and transmit phone calls over an analog or digital interface. For example, the second device 130 may include a phone console, a cellular phone, smartphone, a laptop computer, a tablet computer, or other processing device, such as a call maintenance and routing device or caller identification type device. The second device 130 may be configured to perform one or more of the following: communicate with the telephone exchange 110, establish, maintain, and terminate communication sessions with other devices through the telephone exchange 110, and perform other functionality with respect to communication sessions through the telephone exchange 110.

As discussed, the telephone exchange 110 may provide the second phone number of the second device 130 to the first device 120 while establishing or during the communication session between the second device 130 and the first device 120. In some embodiments, the telephone exchange 110 may provide the second phone number of the second device 130 to the first device 120 when a communication session is attempted to be established, but is not established. For example, the telephone exchange 110 may request to establish a communication session with the first device 120, but the first device 120 may decline. For example, the first device 120 may decline to establish a communications session when a user of the first device 120 does not take action to establish the communication session (e.g., the user may not hear or choose not to answer) or the user affirmatively declines to establish the communication session (e.g., the user may decline or dismiss a request for the communication session). In these and other embodiments, the first device 120 may still receive indication of the second phone number of the second device 130 that requested the communication session through the telephone exchange 110.

After receiving the second phone number, the first device 120 may process the second phone number. In some embodiments, the first device 120 may begin processing the second phone number by determining the number of digits of the second phone number. When the second phone number is equal to a particular number of digits, for example ten, the first device 120 may continue processing the second phone number. When the second phone number is not equal to the particular number, the processing may stop and the second phone number may be stored.

In some embodiments, the first device 120 may continue processing the second phone number by determining if the first digit in the second phone number is a particular number, such as the number one. When the first digit in the second phone number is not the particular number, the first device 120 may continue processing the second phone number. When the first digit in the second phone number is the particular number, the processing may stop and the second phone number may be stored.

In these and other embodiments, the first device 120 may continue processing the second phone number based on a prepending setting in the first device 120. In some embodiments, the prepending setting may be selected previously by a user of the first device 120. In these and other embodiments, the prepending setting may be selected based on the operation of the telephone exchange 110. For example, the telephone exchange 110 may require that phone numbers provided to establish a communication session begin with a particular digit or digits. However, the telephone exchange 110 may not provide phone numbers that lead with the particular digit or digits. An appropriate prepending setting may be selected based on the behavior of the telephone exchange 110.

As another example, the telephone exchange 110 may require that phone numbers provided to establish a communication session that do not partially match the phone number of the device requesting the communication session (e.g., when a caller is calling outside his/her area code such that the area code of the user's number and the area code of the number being called do not match) begin with a particular digit or digits. However, the telephone exchange 110 may not provide phone numbers that lead with the particular digit or digits. An appropriate prepending setting may be selected based on this behavior of the telephone exchange.

In some embodiments, the prepending setting may be selected from three candidate prepending settings. A first candidate prepending setting may involve not adjusting the second phone number. A second candidate prepending setting may involve always adjusting the second phone number. A third candidate prepending setting may involve comparing a portion of the second phone number to a portion of the first phone number and based on the comparison, adjusting the second phone number.

When the first candidate prepending setting is selected, the second phone number may be stored by the first device 120 as received from the telephone exchange 110. When the second candidate prepending setting is selected, the second phone number may be adjusted by the first device 120. In these and other embodiments, the second phone number may be adjusted by prepending a digit to the second phone number. In some embodiments, the digit prepended to the second phone number may be the number one (1). For example, the second phone number as received from the telephone exchange 110 may be 888-888-8888. Prepending a digit of one to the second phone number may result in the second phone number being 1-888-888-8888.

When the third candidate prepending setting is selected, a portion of the second phone number may be compared to a portion of the first phone number. In some embodiments, the digits of the first phone number and the second phone number that correspond to an area code of the first and second phone numbers may be compared. In these and other embodiments, the digits of the first and second phone numbers that may be compared may be the eighth, ninth, and tenth digits when counting from the right most digit of the first and second phone numbers. For example, if the first phone number is 999-999-9999 and the second phone number is 888-888-8888, the eighth, ninth, and tenth digits when counting from the right most digit of the first phone number is 999 and of the second phone number is 888. When the comparison indicates that the portions of the first and second phone numbers are not the same, the second phone number may be prepended with a digit to the second phone number. When the comparison indicates that the portions of the first and second phone numbers are the same, the second phone number may be stored without prepending a digit to the second phone number.

The second phone number may be processed and stored by the first device 120 during or after the communication session. In some embodiments, the second phone number may be processed and stored automatically without intervention by a user of the first device 120. In these and other embodiments, the first device 120 may automatically process and store the second phone number directly or soon after receiving the second phone number from the telephone exchange 110. In some embodiments, the first device 120 may automatically process and store the second phone number before the second phone number is presented to a user in any form or stored in a manner such that the second phone number may be accessed at the request of the user to establish a communication session. For example, a use of a redial functionality and presentation of caller identification information may be performed using the processed second phone number and not using the second phone number as received from the telephone exchange 110. As a result, a user of the first device 120 may be unaware the telephone exchange 110 is not providing the second phone number in the same form as presented to the user by the first device 120. Thus, the first device 120 may automatically help to compensate for inadequacies of phone numbers provided by the telephone exchange 110 after reception of the phone numbers from the telephone exchange 110 and without input from a user of the first device 120.

After storage of the second phone number, the stored second phone number may be used by the first device 120. For example, the stored second phone number may be used to display to a user of the first device 120, establish a communication session with the second device 130, and create a contact with respect to the second device 130, among other uses of the second phone number.

As described in this disclosure, the first device 120 may thus automatically compensate for phone numbers provided by the telephone exchange 110 that are not appropriately constructed to establish a communication session through the telephone exchange 110. Thus, the method and/or systems described in this disclosure provide a technical solution to a technical problem in the realm of telecommunications, namely the problem of telephone exchanges incorrectly providing phone numbers that has arisen through development and changes in telephone exchanges.

Modifications, additions, or omissions may be made to the system 100 without departing from the scope of the present disclosure. For example, in some embodiments, the second device 130 may also be configured to process the phone numbers provided by the telephone exchange 110 in a manner analogous to the processing performed by the first device 120.

Figure 2:
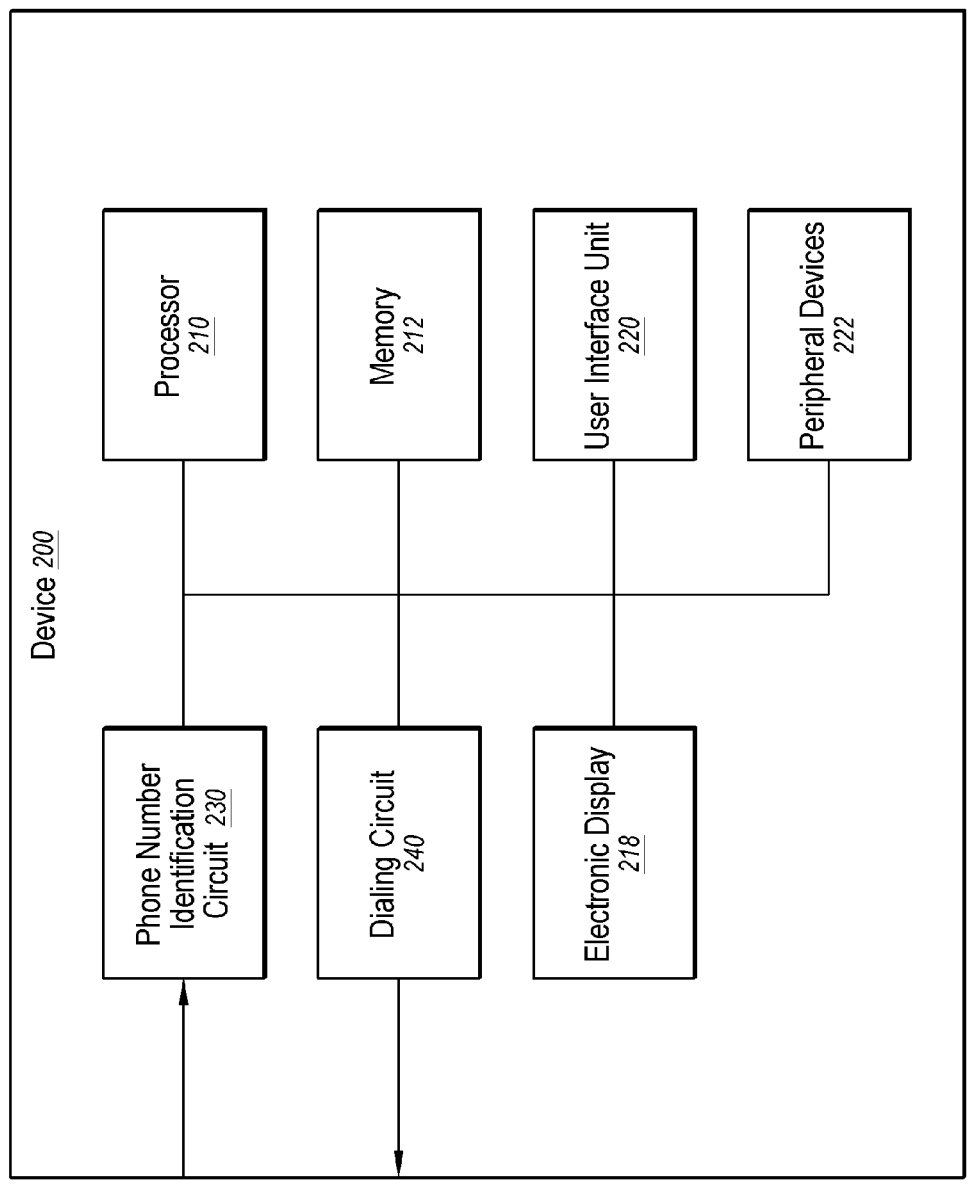
FIG. 2 illustrates an example device configured to adjust a phone number.

FIG. 2 illustrates an example device 200 configured to adjust a phone number. The device 200 may be arranged in accordance with at least one embodiment described in the present disclosure. The device 200 may be a telephonic device, in some embodiments. The device 200 may include a processor 210, a memory 212, an electronic display 218, a user interface unit 220, peripheral devices 222, a phone number identification circuit 230, and a dialing circuit 240. In some embodiments, the device 200 may be an example of the first device 120 of FIG. 1.

Generally, the processor 210 may include any suitable special-purpose or general-purpose computer, computing entity, or processing device including various computer hardware or software modules and may be configured to execute instructions stored on any applicable computer-readable storage media. For example, the processor 210 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data.

Although illustrated as a single processor in FIG. 2, it is understood that the processor 210 may include any number of processors distributed across any number of networks or physical locations that are configured to perform individually or collectively any number of operations described herein.

In some embodiments, the processor 210 may interpret and/or execute program instructions and/or process data stored in the memory 212. In some embodiments, the processor 210 may fetch program instructions from a first portion of the memory 212 and load the program instructions into another portion of the memory 212 for execution. After the program instructions are loaded into the other portion of the memory 212, the processor 210 may execute the program instructions. For example, the instructions may include the processor 210 processing a phone number received from a telephone exchange to determine whether to prepend a digit to the phone number.

The memory 212 may include one or more types of computer-readable storage media or one or more computer-readable storage mediums for carrying or having computer-executable instructions or data structures stored thereon. Such computer-readable storage media may be any available media that may be accessed by a general-purpose or special-purpose computer, such as the processor 210. By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable storage media. In these and other embodiments, the term "non-transitory" as used herein should be construed to exclude only those types of transitory media that were found to fall outside the scope of patentable subject matter in the Federal Circuit decision of *In re Nuijten*, 500 F.3d 1346 (Fed. Cir. 2007). In some embodiments, computer-executable instructions may include, for example, instructions and data configured to cause the processor 210 to perform a certain operation or group of operations, such as one or more blocks of the methods 300, 400, 500, and/or 600.

The electronic display 218 may be configured as one or more electronic displays, like an LCD, LED, or other type display. The electronic display 218 may be configured to present video, text captions, user interfaces, phone numbers, and other data as directed by the processor 210.

The user interface unit 220 may include any device to allow a user to interface with the device 200. For example, the user interface unit 220 may include a mouse, a track pad, a keyboard, and/or a touchscreen, among other devices. The user interface unit 220 may receive input from a user and provide the input to the processor 210. For example, electronic display 218 may provide an indication of candidate prepending settings for selecting. The user interface unit 220 may be configured to receive input from a user regarding a selection of a candidate prepending setting from the candidate prepending settings. Alternatively or additionally, the device 200, using the processor 210 may follow instructions to determine the candidate prepending setting based on interactions between the device 200 and a telephone exchange. For example, when a phone number is received from a telephone exchange, the device 200 may attempt to establish a communication session with the phone number. If the communications session is established, the device 200 may select a candidate prepending setting of never. If the communications session is not established, the device 200 may select a candidate prepending setting of always. Using similar trial and error, the device 200 may further select other candidate prepending settings.

As another example, the user interface unit 220 may be configured to obtain input from a user regarding a phone number or an area code of a phone number assigned to the device 200. Alternatively or additionally, the device 200 may automatically determine the phone number and/or area code of the phone number assigned to the device 200.

The peripheral devices 222 may include one or more devices. For example, the peripheral devices may include a microphone, an imager, and/or a speaker, among other peripheral devices to assist a user with communication sessions.

The phone number identification circuit 230 may be configured to receive an indication of a phone number from a telephone exchange. The phone number may be associated with a device that requested a communication session with the device 200. In some embodiments, the phone number identification circuit 230 may include analog and/or digital circuitry to determine the phone number from a series of tones provided to the device 200 from a telephone exchange. For example, the phone number identification circuit 230 may include a decoder for decoding tones encoded using frequency shift keying with the phone number. In these and other embodiments, the telephone exchange may encode the phone number using frequencies and provide the frequencies to the phone number identification circuit 230. The phone number identification circuit 230 may decode the frequencies to obtain the telephone number. In some embodiments, the phone number identification circuit 230 may include digital circuitry to decode or unpack Internet Protocol packets to obtain the phone number from packets provided to the device 200.

The dialing circuit 240 may be configured to perform the proper procedures to establish, maintain, and terminate communication sessions with a telephone exchange. In these and other embodiments, the dialing circuit 240 may receive a telephone number to establish a communication session from the memory 212, the user interface unit 220, and/or the peripheral devices 222. In some embodiments, the processor 210 may direct the dialing circuit 240 regarding procedures with respect to communication sessions.

Modifications, additions, or omissions may be made to the device 200 without departing from the scope of the present disclosure. For example, when the device 200 is part of the first device 120 of FIG. 1, the device 200 may not include one or more of the electronic display 218, the peripheral devices 222, or other aspects of the device 200. Alternatively or additionally, the device 200 may not include the phone number identification circuit 230. In these and other embodiments, the processor 210 may obtain the phone number from the telephone exchange or one or more other elements of the device 200 may obtain the phone number. Alternatively or additionally, the dialing circuit 240 and the phone number identification circuit 230 may be combined in a single circuit, device, or module.

Figure 3:
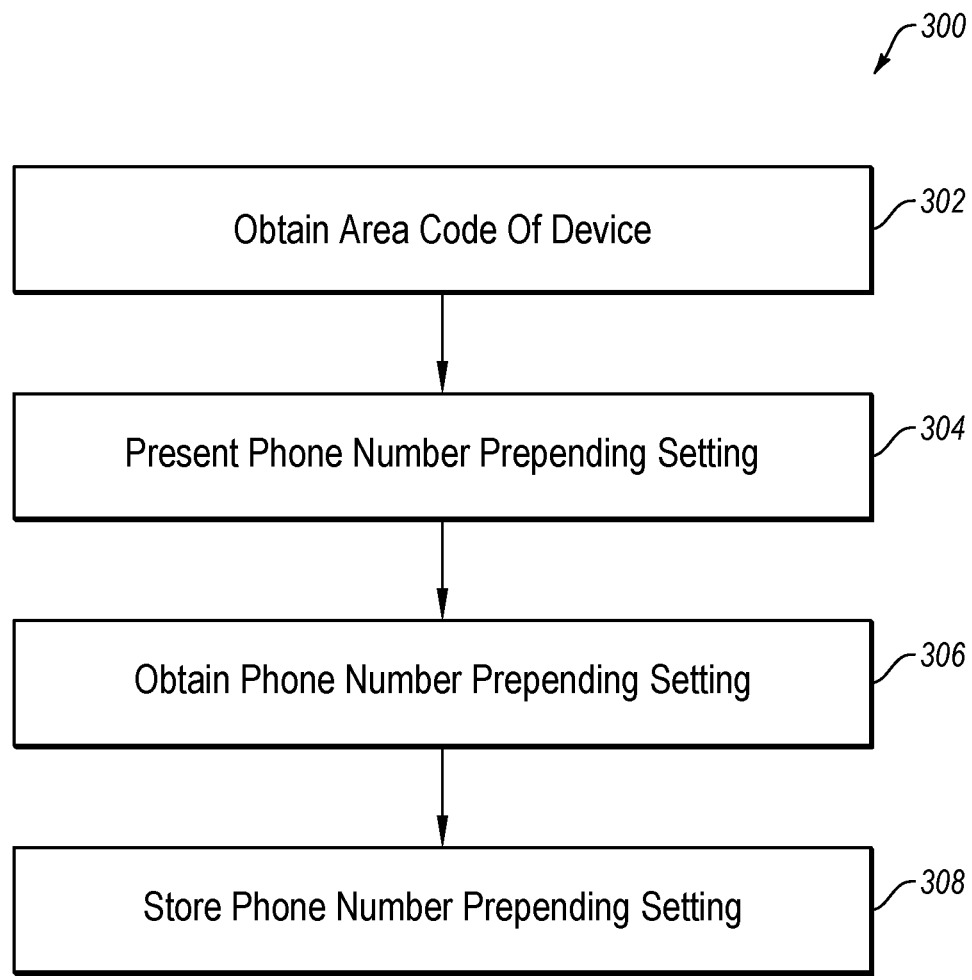
FIG. 3 is a flowchart of an example method to obtain information.

FIG. 3 is a flowchart of an example method 300 to obtain information. The method 300 may be arranged in accordance with at least one embodiment described in the present disclosure. The method 300 may be performed, in whole or in part, in some embodiments by a system, such as the system 100, the device 200, and/or the system 700 of FIGS. 1, 2, and 7, respectively. In these and other embodiments, some or all of the steps of the method 300 may be performed based on the execution of instructions stored on one or more non-transitory computer-readable media. Although illustrated as discrete blocks, various blocks may be divided into additional blocks, combined into fewer blocks, or eliminated, depending on the desired implementation.

The method 300 may begin at block 302, where an area code of a device may be obtained. In some embodiments, the device may be a telephonic device. The area code of the device may be an area code of a phone number assigned to the device for communication through a telephone exchange. In some embodiments, the area code may be obtained through receiving input from a user. Alternatively or additionally, a phone number of the device may be obtained from the telephone exchange or other device and the area code may be obtained from the phone number.

In block 304, phone number prepending settings may be presented. For example, the phone number prepending settings may be presented in a display of the device to a user of the device.

In block 306, a phone number prepending setting may be obtained. In some embodiments, one of the phone number prepending settings may be obtained through selection of the one of the phone number prepending settings by a user of the device. For example, one of the phone number prepending settings may be selected during an initial set-up of the device, or at other times of operation of the device. In some embodiments, the phone number prepending settings may be obtained by being selected remotely through an administrator of the device or automatically based on the interaction of the device with the telephone exchange.

In block 308, the selected phone number prepending setting may be stored. After storage, the selected phone number prepending setting may be recalled and may be used during processing of phone numbers received at the device by a telephone exchange.

One skilled in the art will appreciate that, for this and other processes, operations, and methods disclosed herein, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments.

Figure 4A:
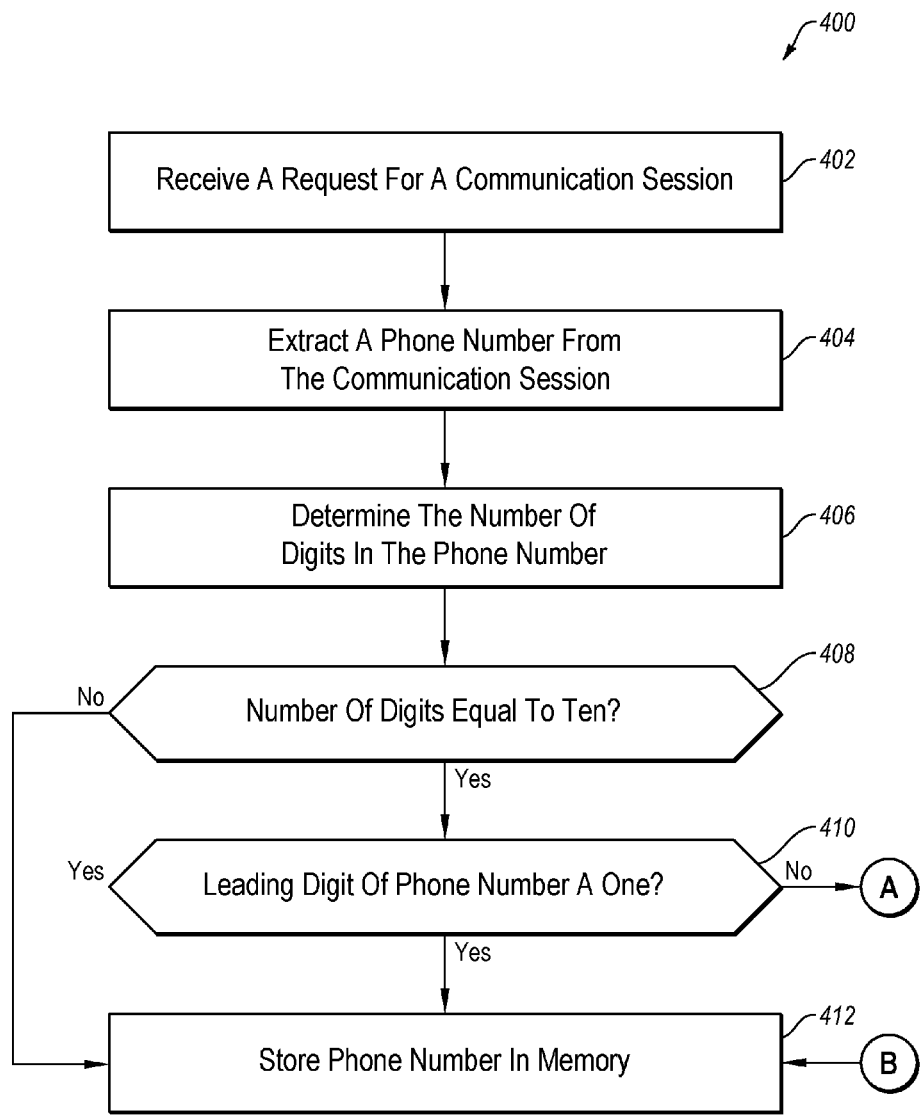
FIGS. 4A and 4B include a flowchart of an example method to adjust a phone number.
Figure 4B:
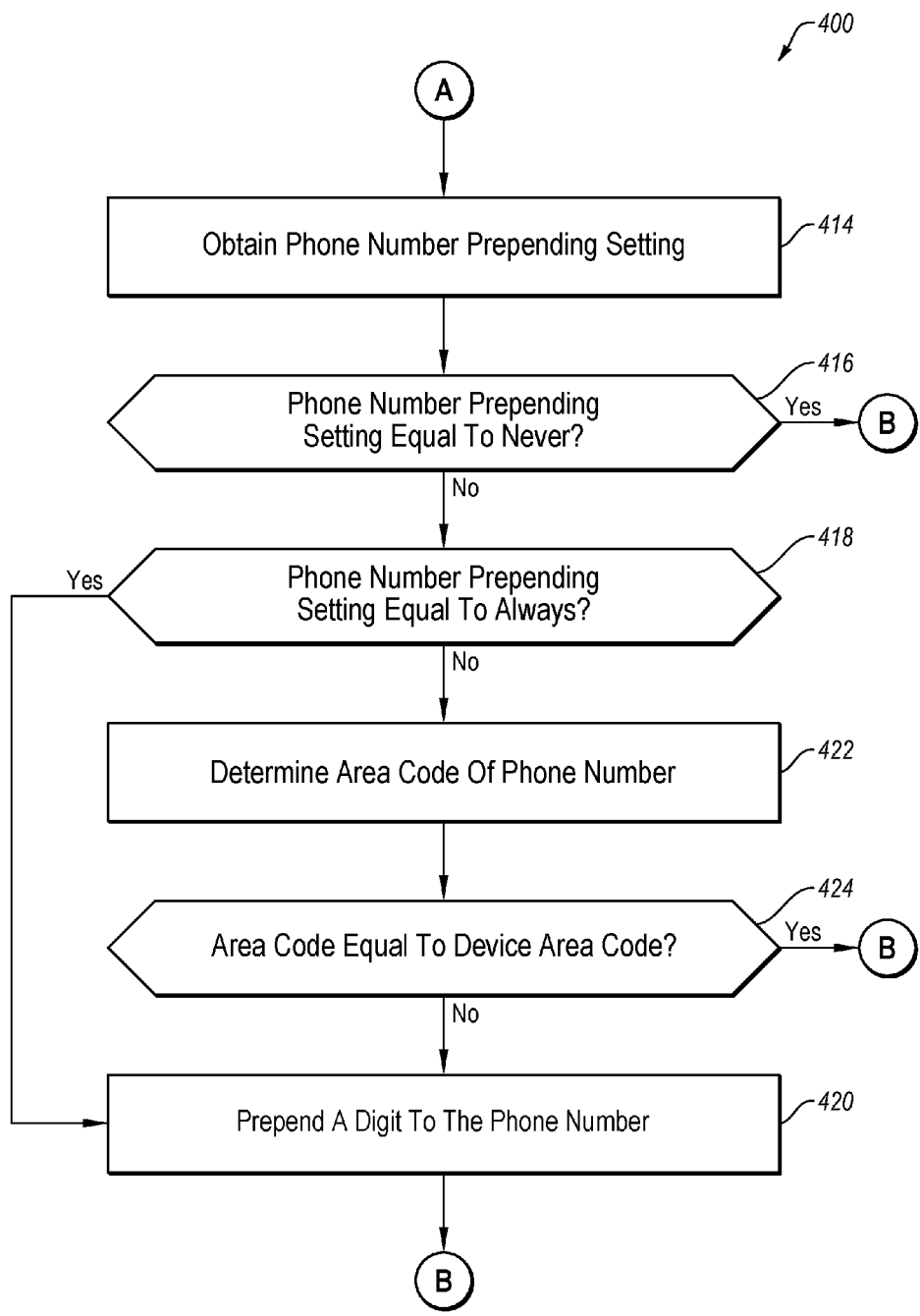

FIGS. 4A and 4B include a flowchart of an example method 400 to adjust a phone number. The method 400 may be arranged in accordance with at least one embodiment described in the present disclosure. The method 400 may be performed, in whole or in part, in some embodiments by a system, such as the system 100, the device 200, and/or the system 700 of FIGS. 1, 2, and 7, respectively. In these and other embodiments, some or all of the steps of the method 400 may be performed based on the execution of instructions stored on one or more non-transitory computer-readable media. Although illustrated as discrete blocks, various blocks may be divided into additional blocks, combined into fewer blocks, or eliminated, depending on the desired implementation.

The method 400 may begin at block 402, where a request for a communication session may be received at a device. In some embodiments, the device may be a telephonic device and the communication session may be a phone call. For example, the request for the communication session may be an indication of an incoming phone call that is received by the telephonic device.

In block 404, a phone number may be extracted from the request for the communication session by the telephonic device. In some embodiments, the phone number may be a phone number assigned to a device that initiated the request for the communication session. For example, the request for the communication session may be an indication of an incoming phone call that includes caller identification information, which may include a phone number, of the device that placed the phone call to the telephonic device. In these and other embodiments, the telephonic device may extract the phone number in the caller identification information.

In block 406, the number of digits in the phone number may be determined.

In block 408, it may be determined if the number of digits in the phone number is equal to ten. When the number of digits in the phone number is equal to ten, the method 400 may proceed to block 410. When the number of digits in the phone number is not equal to ten, the method 400 may proceed to block 412.

In block 410, it may be determined if the leading digit of the phone number is a one. When the leading digit of the phone number is a one, the method 400 may proceed to block 412. When the leading digit of the phone number is not a one, the method 400 may proceed to block 414.

In block 412, the phone number may be stored. The phone number may be subsequently used after storage by the device to redial the phone number, present the phone number, or save the phone number in a contact, among other uses of the phone number.

In block 414, a phone number prepending setting may be obtained. In some embodiments, the phone number prepending setting may be obtained from memory. In these and other embodiments, the phone number prepending setting may have been previously selected and stored. Alternatively or additionally, the phone number prepending setting may be obtained through a user selection or other process.

In block 416, it may be determined if the phone number prepending setting is equal to never. The phone number prepending setting of never may indicate that no digits are prepended to the phone number. When the phone number prepending setting is equal to never, the method 400 may proceed to block 412. When the phone number prepending setting is not equal to never, the method 400 may proceed to block 418.

In block 418, it may be determined if the phone number prepending setting is equal to always. The phone number prepending setting of always may indicate that a digit is prepended to the phone number. When the phone number prepending setting is equal to always, the method 400 may proceed to block 420. When the phone number prepending setting is not equal to always, the method 400 may proceed to block 422.

In block 420, a digit may be prepended to the phone number. In some embodiments, the digit may be a number one. Block 420 may be followed by block 412.

In block 422, an area code of the phone number may be determined. In these and other embodiments, the first, second, and third digits of the phone number may be determined to be the area code of the phone number.

In block 424, it may be determined if the area code of the phone number is equal to the area code of the phone number associated with the device. When the area code of the phone number is equal to the area code of the phone number associated with the device, the method 400 may proceed to block 412. When the area code of the phone number is not equal to the area code of the phone number associated with the device, the method 400 may proceed to block 420.

One skilled in the art will appreciate that, for this and other processes, operations, and methods disclosed herein, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments.

Figure 5:
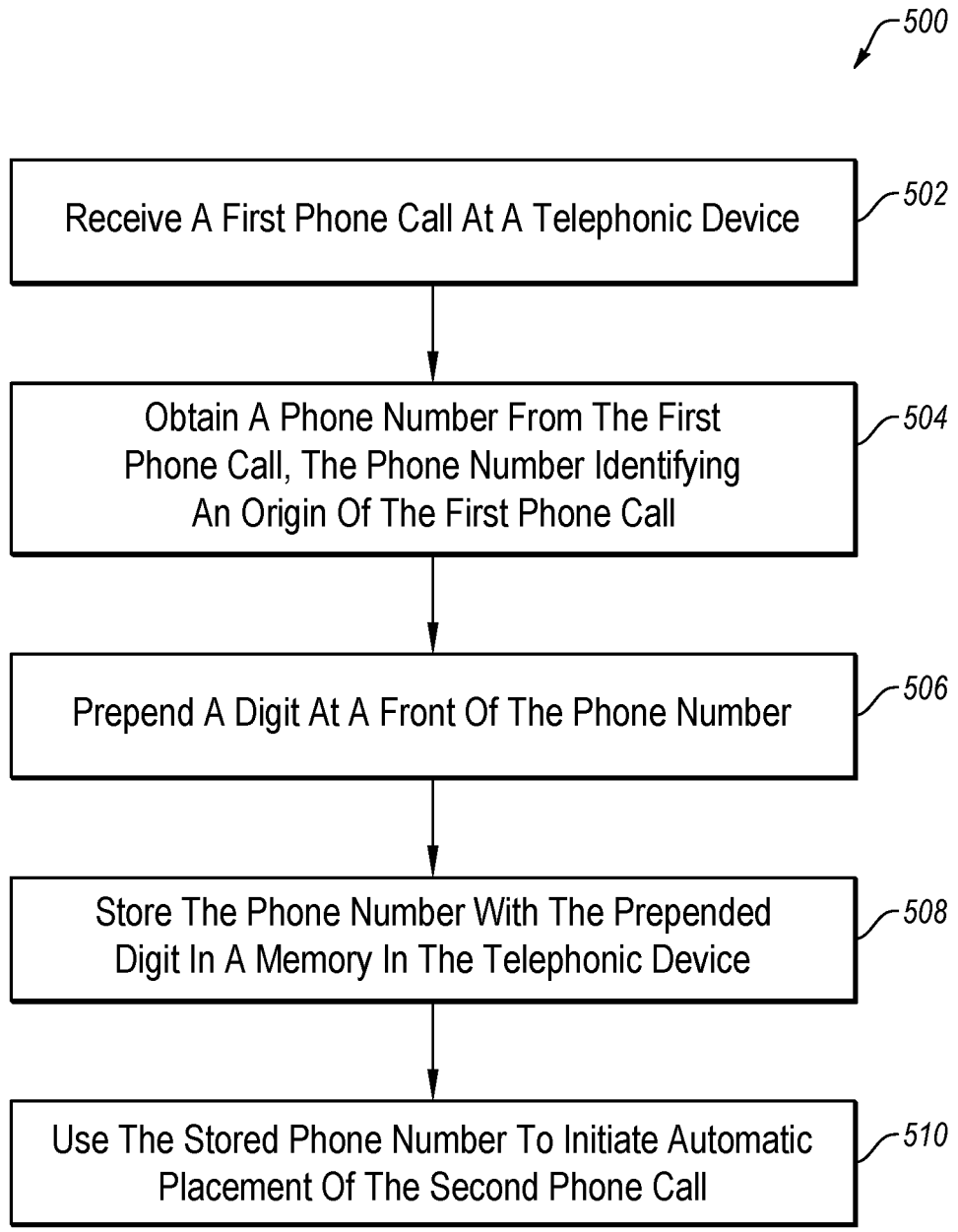
FIG. 5 is a flowchart of another example method to adjust a phone number.

FIG. 5 is a flowchart of another example method 500 to adjust a phone number. The method 500 may be arranged in accordance with at least one embodiment described in the present disclosure. The method 500 may be performed, in whole or in part, in some embodiments by a system, such as the system 100, the device 200, and/or the system 700 of FIGS. 1, 2, and 7, respectively. In these and other embodiments, some or all of the steps of the method 500 may be performed based on the execution of instructions stored on one or more non-transitory computer-readable media. Although illustrated as discrete blocks, various blocks may be divided into additional blocks, combined into fewer blocks, or eliminated, depending on the desired implementation.

The method 500 may begin at block 502, where a first phone call may be received at a telephonic device. In some embodiments, the first phone call may be received from a telephone exchange.

In block 504, a phone number from the first phone call may be obtained. In some embodiments, the phone number may identify an origin of the first phone call. In some embodiments, the phone number may be obtained through call identification provided by the telephone exchange.

In block 506, a digit may be prepended to the phone number. In some embodiments, the digit may be a number one.

In block 508, the phone number with the prepended digit may be stored in a memory in the telephonic device. In some embodiments, the phone number may be stored as a redial number or a caller-ID number associated with the first phone call.

In block 510, the stored phone number may be used to initiate automatic placement of the second phone call. For example, in some embodiments, the automatic placement of the second phone call may be performed based on the telephonic device obtaining a request to redial a previously received number.

One skilled in the art will appreciate that, for this and other processes, operations, and methods disclosed herein, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments.

For example, in some embodiments, the method 500 may further include before obtaining the first phone call, obtaining a phone number prepending setting. Alternatively or additionally, the method 500 may further include, before prepending the digit to the phone number, checking the phone number prepending setting. In some embodiments, the phone number prepending setting may be selected from one of the following: never prepend a digit, always prepend a digit, and prepend a digit based on a telephonic area code associated with a telephonic device, among other options.

In these and other embodiments, the method 500 may further include determining a number of digits of the phone number and comparing the number of digits of the phone number to ten. In some embodiments, the phone number prepending setting may be obtained in response to the number of digits of the phone number being equal to ten.

In some embodiments, the method 500 may further include determining a number of digits of the phone number and comparing the number of digits of the phone number to ten. In these and other embodiments, the digit may be prepended to the phone number in response to the number of digits of the phone number being equal to ten.

In some embodiments, the method 500 may further include obtaining a telephonic area code associated with a telephonic device and comparing a first three digits of the phone number to the telephonic area code. In these and other embodiments, the digit may be prepended to the phone number in response to the first three digits of the phone number not being equal to the telephonic area code. In these and other embodiments, the method 500 may further include before obtaining the first phone call, obtaining a phone number prepending setting and checking the phone number prepending setting. In these and other embodiments, in response to the phone number prepending setting equaling a first response, such as prepend a digit based on a telephonic area code associated with a telephonic device, the following steps are performed: obtaining the telephonic area code, comparing the first three digits, and in response to the first three digits of the phone number not being equal to the telephonic area code, prepending the digit.

Figure 6A:
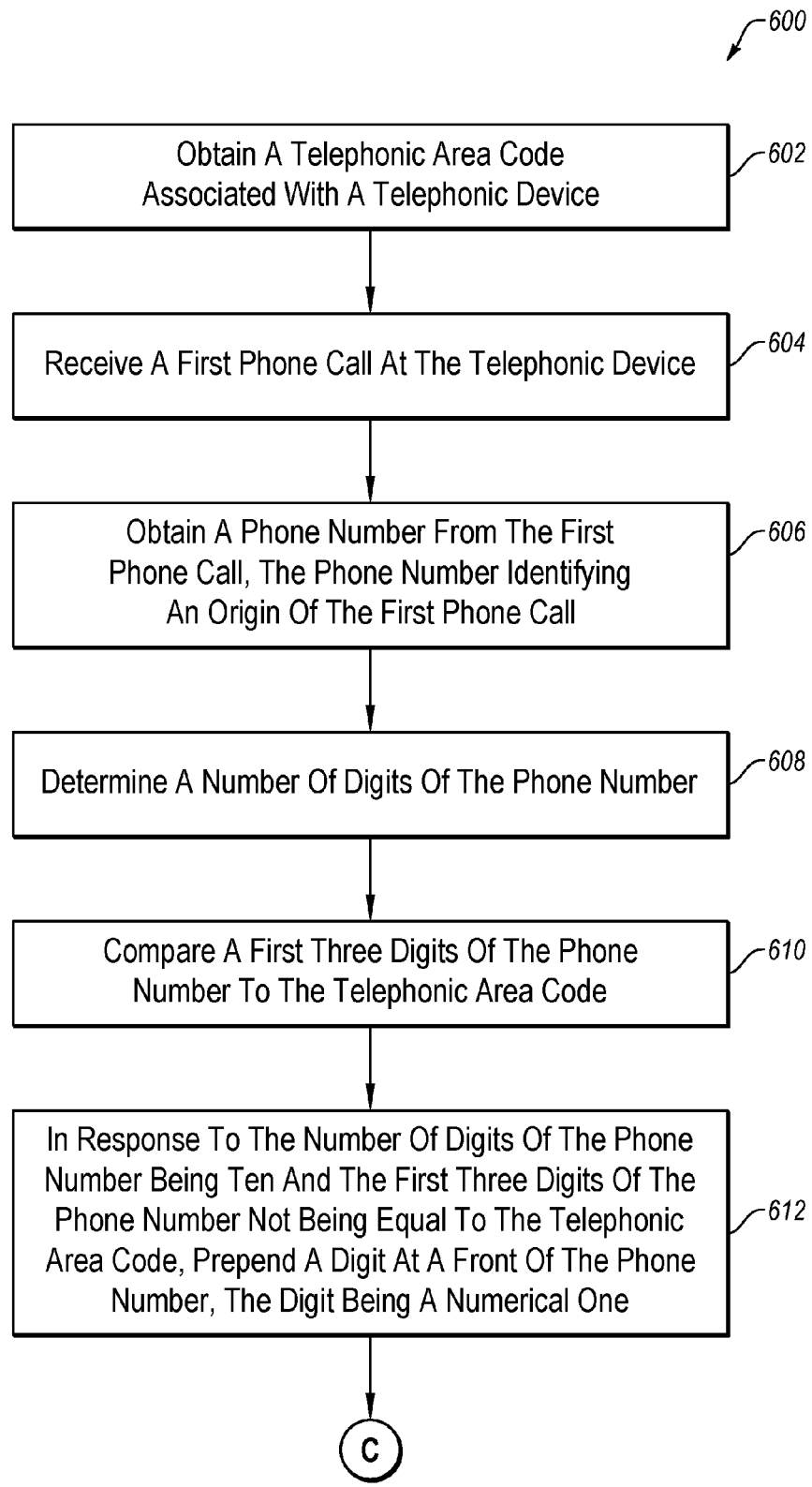
FIGS. 6A and 6B illustrate a flowchart of another example method to adjust a phone number.
Figure 6B:
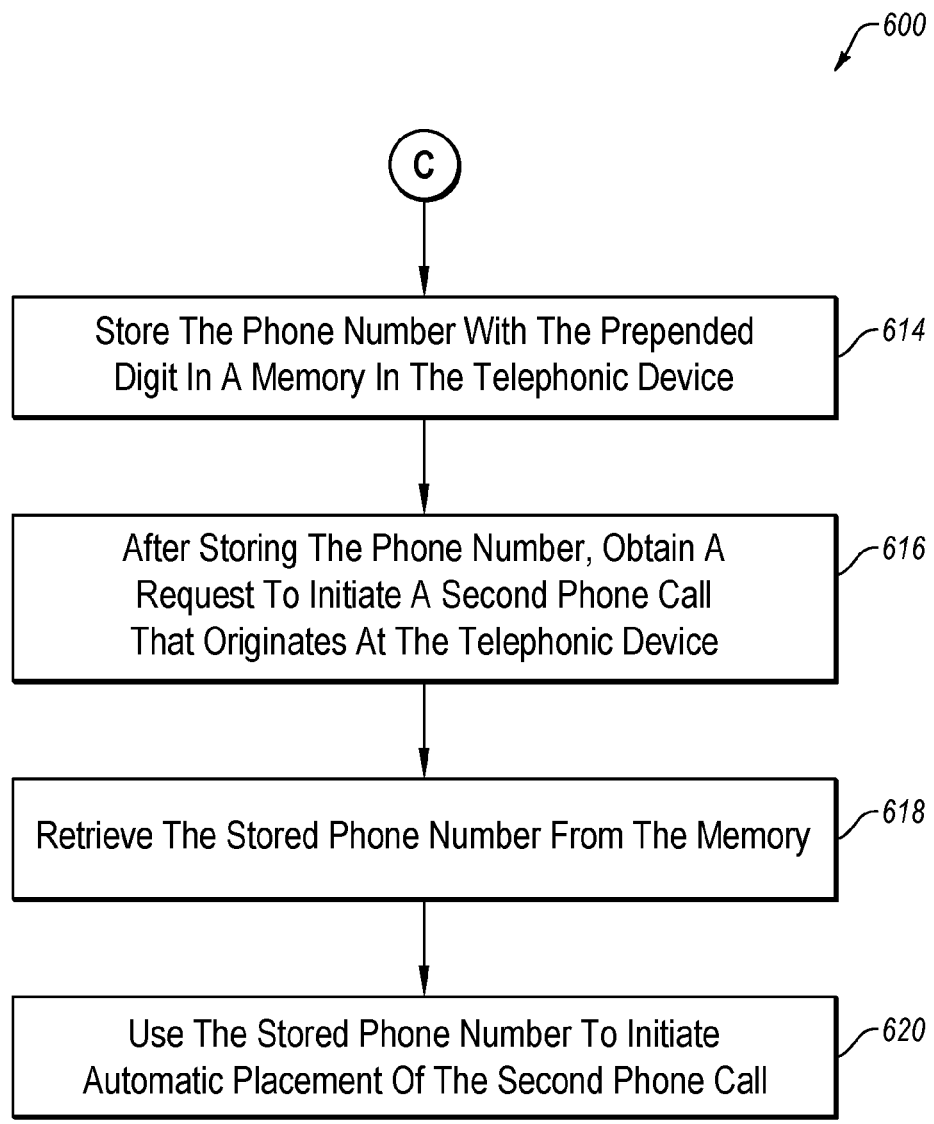

FIGS. 6A and 6B illustrate a flowchart of another example method 600 to adjust a phone number. The method 600 may be arranged in accordance with at least one embodiment described in the present disclosure. The method 600 may be performed, in whole or in part, in some embodiments by a system, such as the system 100, the device 200, and/or the system 700 of FIGS. 1, 2, and 7, respectively. In these and other embodiments, some or all of the steps of the method 600 may be performed based on the execution of instructions stored on one or more non-transitory computer-readable media. Although illustrated as discrete blocks, various blocks may be divided into additional blocks, combined into fewer blocks, or eliminated, depending on the desired implementation.

The method 600 may begin at block 602, where a telephonic area code associated with a telephonic device may be obtained. In block 604, a first phone call may be received at the telephonic device. In block 606, a phone number from the first phone call may be obtained. In some embodiments, the phone number may identify an origin of the first phone call.

In block 608, a number of digits of the phone number may be determined. In block 610, a first three digits of the phone number may be compared to the telephonic area code.

In block 612, in response to the number of digits of the phone number being ten and the first three digits of the phone number not being equal to the telephonic area code, a digit may be prepended the phone number. In these and other embodiments, the digit may be a numerical one.

In block 614, the phone number with the prepended digit may be stored in a memory in the telephonic device. In some embodiments, the phone number may be stored as a redial number or a caller-ID number associated with the first phone call.

In block 616, after storing the phone number, a request to initiate a second phone call that originates at the telephonic device may be obtained. In block 618, the stored phone number may be retrieved from the memory. In block 620, the stored phone number may be used to initiate automatic placement of the second phone call.

One skilled in the art will appreciate that, for this and other processes, operations, and methods disclosed herein, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments.

For example, in some embodiments, the method 600 may further include obtaining a third phone call at the telephonic device and extracting a second phone number from the third phone call, the second phone number identifying an origin of the third phone call. The method 600 may further include determining a number of digits of the second phone number and in response to the number of digits of the second phone number not being equal to ten, storing the unmodified second phone number in the memory in the telephonic device. The method 600 may further include after storing the second phone number, obtaining a request to initiate a fourth phone call that originates at the telephonic device and retrieving the stored second phone number from the memory. The method 600 may further include using the stored second phone number to automatically place the fourth phone call.

In some embodiments, the method 600 may further include obtaining a fifth phone call at the telephonic device and extracting a third phone number from the fifth phone call, the third phone number identifying an origin of the fifth phone call. The method 600 may further include comparing a first three digits of the third phone number to the telephonic area code and in response to the first three digits of the phone number being equal to the telephonic area code, storing the unmodified third phone number in the memory in the telephonic device. The method 600 may further include after storing the third phone number, obtaining a request to initiate a sixth phone call that originates at the telephonic device and retrieving the stored third phone number from the memory. The method 600 may further include using the stored third phone number to automatically place the sixth phone call.

Figure 7:
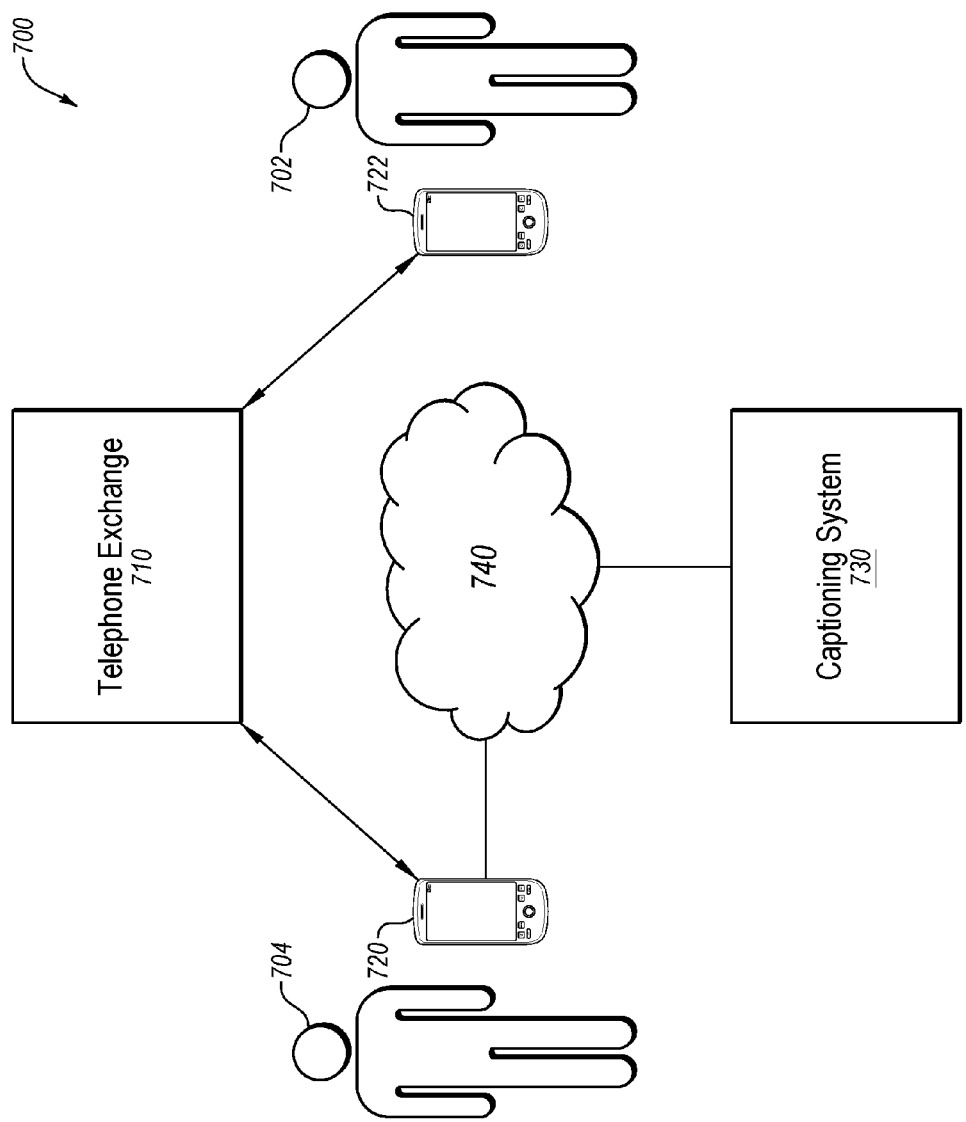
FIG. 7 illustrates an example communication system that may include a device configured to adjust a phone number.

FIG. 7 illustrates an example communication system 700 that may include a first device 720 configured to adjust a phone number. The communication system 700 may be arranged in accordance with at least one embodiment described in the present disclosure. The communication system 700 may include a telephone exchange 710, the first device 720, a second device 722, and a captioning system 730. The first device 720 and the captioning system 730 may be communicatively coupled by a network 740, such as a digital or analog network. The telephone exchange 710 and the second device 722 may be analogous to the telephone exchange 110 and the second device 130, respectively, of FIG. 1.

As illustrated, the first device 720 may be analogous and include the functionality of the first device 120 of FIG. 1. FIG. 7 further illustrates example additional functionality that may be provided by the first device 720 to a hearing-impaired user 704 of the first device 720.

In some embodiments, the communication system 700 illustrated may be configured to facilitate an assisted call between a second user 702 and the hearing-impaired user 704. As used in the present disclosure, a "hearing-impaired user" may refer to a person with diminished hearing capabilities. Hearing-impaired users often have some level of hearing ability that has usually diminished over a period of time such that the hearing-impaired user can communicate by speaking, but that the hearing-impaired user often struggles in hearing and/or understanding others.

In some embodiments, a communication session may be established between the first device 720 and the second device 722 using the telephone exchange 710. The captioning system 730 may be an assistive service, which is intended to permit a hearing-impaired person to utilize a communication network and assist their understanding of a conversation by providing text captions to supplement voice conversation occurring during communication sessions with other devices, such as the second device 722.

During a captioning communication session, the captioning system 730 and the first device 720 maybe be communicatively coupled using networking protocols. In some embodiments, during the communication session between the first device 720 and the second device 722, the first device 720 may provide the audio signal from the second device 722 to the captioning system 730.

At the captioning system 730, a call assistant may listen to the audio signal of the second user 702 and "revoice" the words of the second user 702 to a speech recognition computer program tuned to the voice of the call assistant. In these and other embodiments, the call assistant may be an operator who serves as a human intermediary between the second user 702 and the hearing-impaired user 704. In some embodiments, text captions may be generated by the speech recognition computer as a transcription of the audio signal of the second user 702. The text captions may be provided to the first device 720 being used by the hearing-impaired user 704 over the network 740. The first device 720 may display the text captions while the hearing-impaired user 704 carries on a normal conversation with the second user 702. The text captions may allow the hearing-impaired user 704 to supplement the voice signal received from the second device 722 and confirm his or her understanding of the words spoken by the second user 702.

Modifications, additions, or omissions may be made to the communication system 700 without departing from the scope of the present disclosure. For example, in some embodiments, the second user 702 may be hearing impaired. In these and other embodiments, the captioning system 730 may provide text captions to the second device 722 based on audio data transmitted by the first device 720. Alternately or additionally, the captioning system 730 may include additional functionality. For example, the captioning system 730 may edit the text captions or make other alterations to the text captions after presentation of the text captions on the first device 720.

As indicated above, the embodiments described herein may include the use of a special purpose or general purpose computer (e.g., the processor 210 of FIG. 2) including various computer hardware or software modules, as discussed in greater detail below. Further, as indicated above, embodiments described herein may be implemented using computer-readable media (e.g., the memory 212 of FIG. 2) for carrying or having computer-executable instructions or data structures stored thereon.

In some embodiments, the different components, modules, engines, and services described herein may be implemented as objects or processes that execute on a computing system (e.g., as separate threads). While some of the systems and methods described herein are generally described as being implemented in software (stored on and/or executed by general purpose hardware), specific hardware implementations or a combination of software and specific hardware implementations are also possible and contemplated.

In accordance with common practice, the various features illustrated in the drawings may not be drawn to scale. The illustrations presented in the present disclosure are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms "first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A method to adjust a phone number, the method comprising:
    obtaining a telephonic area code associated with a telephonic device;
    receiving a first phone call at the telephonic device;
    obtaining a phone number from the first phone call, the phone number identifying an origin of the first phone call;
    determining a number of digits of the phone number;
    comparing a first three digits of the phone number to the telephonic area code;
    in response to the number of digits of the phone number being ten and the first three digits of the phone number not being equal to the telephonic area code, prepending a digit to the phone number, the digit being a numerical one;
    storing the phone number with the prepended digit in a memory in the telephonic device;
    after storing the phone number, obtaining a request to initiate a second phone call that originates at the telephonic device;
    retrieving the stored phone number from the memory; and
    using the stored phone number to initiate automatic placement of the second phone call.

2. The method of claim 1, further comprising:
    obtaining a third phone call at the telephonic device;
    extracting a second phone number from the third phone call, the second phone number identifying an origin of the third phone call;
    determining a number of digits of the second phone number;
    in response to the number of digits of the second phone number not being equal to ten, storing the second phone number in the memory in the telephonic device;
    after storing the second phone number, obtaining a request to initiate a fourth phone call that originates at the telephonic device;
    retrieving the stored second phone number from the memory; and
    using the stored second phone number to automatically place the fourth phone call.

3. The method of claim 2, further comprising:
    obtaining a fifth phone call at the telephonic device;
    extracting a third phone number from the fifth phone call, the third phone number identifying an origin of the fifth phone call;
    comparing a first three digits of the third phone number to the telephonic area code;
    in response to the first three digits of the phone number being equal to the telephonic area code, storing the third phone number in the memory in the telephonic device;
    after storing the third phone number, obtaining a request to initiate a sixth phone call that originates at the telephonic device;
    retrieving the stored third phone number from the memory; and
    using the stored third phone number to automatically place the sixth phone call.

4. The method of claim 1, wherein the phone number is stored as a redial number or a caller-ID number associated with the first phone call.

5. At least one non-transitory computer-readable media configured to store one or more instructions that when executed by at least one computing system performs the method of claim 1.

6. A method to adjust a phone number, the method comprising:
   obtaining a telephonic area code assigned to a telephonic device by a telephone exchange that allows the telephonic device to receive communications through the telephone exchange:
   receiving a first phone call at the telephonic device;
   obtaining a phone number from the first phone call, the phone number identifying an origin of the first phone call;
   comparing a first three digits of the phone number to the telephonic area code;
   in response to the first three digits of the phone number not being equal to the telephonic area code, prepending a digit to the phone number; and
   storing the phone number with the prepended digit in a memory in the telephonic device.

7. The method of claim 6, further comprising:
   before receiving the first phone call, obtaining a phone number prepending setting; and
   before prepending the digit to the phone number, obtaining the phone number prepending setting such that the digit is prepended to the phone number in response to the phone number prepending setting.

8. The method of claim 7, wherein the phone number prepending setting is selected from one of the following: never prepend the digit, always prepend the digit, and prepend the digit based on the telephonic area code associated with the telephonic device.

9. The method of claim 8, further comprising:
   determining a number of digits of the phone number; and
   comparing the number of digits of the phone number to ten,
   wherein the phone number prepending setting is obtained in response to the number of digits of the phone number being equal to ten.

10. The method of claim 6, further comprising:
    determining a number of digits of the phone number; and
    comparing the number of digits of the phone number to ten,
    wherein the digit is prepended to the phone number in further response to the number of digits of the phone number being equal to ten.

11. The method of claim 6, further comprising:
    before obtaining the first phone call, obtaining a phone number prepending setting; and
    checking the phone number prepending setting,
    wherein in response to the phone number prepending setting equaling a first response, the following steps are performed: obtaining the telephonic area code, comparing the first three digits, and in response to the first three digits of the phone number not being equal to the telephonic area code, prepending the digit.

12. At least one non-transitory computer-readable media configured to store one or more instructions that when executed by at least one computing system performs the method of claim 6.

13. A telephonic device configured to adjust a phone number, the telephonic device comprising:
    a phone number identification circuit configured to extract a phone number from a first phone call received at the telephonic device;
    a computing system communicatively coupled to the phone number identification circuit and configured to receive the phone number from the phone number identification circuit; and
    at least one non-transitory computer-readable media configured to store one or more instructions that when executed by at least one computing system perform operations including:
       obtaining a telephonic area code assigned to the telephonic device by a telephone exchange that allows the telephonic device to receive communications through the telephone exchange;
       comparing a first three digits of the phone number to the telephonic area code;
       in response to the first three digits of the phone number not being equal to the telephonic area code, prepending a digit to the phone number;
       storing the phone number with the prepended digit in the non-transitory computer-readable media; and
       using the stored phone number to initiate automatic placement of a second phone call.

14. The telephonic device of claim 13, wherein the operations further include:
    before obtaining the first phone call, storing a phone number prepending setting in the non-transitory computer-readable media; and
    before prepending the digit to the phone number, obtaining the phone number prepending setting such that the digit is prepended to the phone number in response to the phone number prepending setting.

15. The telephonic device of claim 14, wherein the phone number prepending setting is selected from one of the following: never prepend the digit, always prepend the digit, and prepend the digit based on the telephonic area code associated with the telephonic device.

16. The telephonic device of claim 15, wherein the operations further include:
    determining a number of digits of the phone number; and
    comparing the number of digits of the phone number to ten,
    wherein the phone number prepending setting is obtained in response to the number of digits of the phone number being equal to ten.

17. The telephonic device of claim 13, wherein the operations further include:
    determining a number of digits of the phone number; and
    comparing the number of digits of the phone number to ten,
    wherein the digit is prepended to the phone number, in response to the number of digits of the phone number being equal to ten.

18. The telephonic device of claim 13, wherein the operations further include:
    before obtaining the first phone call, obtaining a phone number prepending setting; and
    checking the phone number prepending setting,
    wherein in response to the phone number prepending setting equaling a first response, the following steps are performed: obtaining the telephonic area code, comparing the first three digits, and in response to the first three digits of the phone number not being equal to the telephonic area code, prepending the digit.

19. The method of claim 1, wherein the telephonic area code associated with the telephonic device is the telephonic area code assigned to the telephonic device by a telephone exchange that allows the telephonic device to receive communications through the telephone exchange.

\* \* \* \* \*